Figure 1:
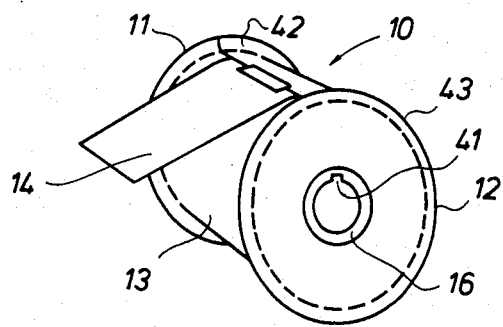

United States Patent [19]

Van Geyte et al.

[11] Patent Number: 4,733,777
[45] Date of Patent: Mar. 29, 1988

[54] LIGHT-TIGHTLY PACKAGED ROLL OF LIGHT SENSITIVE MATERIAL

[75] Inventors: Danny Van Geyte, Wilrijk; Dirk Peeters, Kontich, both of Belgium

[73] Assignee: Agfa-Gevaert N.V., Mortsel, Belgium

[21] Appl. No.: 3,060

[22] Filed: Jan. 13, 1987

[30] Foreign Application Priority Data

Jan. 20, 1986 [EP] European Pat. Off. ...... EP86200080

[51] Int. Cl.⁴ .............................................. B68D 85/38
[52] U.S. Cl. .................................. 206/316; 206/400; 206/414; 206/408; 206/416; 220/67
[58] Field of Search ............... 206/316, 400, 414, 398, 206/401, 402, 408, 415, 416, 413; 220/67

[56] References Cited

U.S. PATENT DOCUMENTS

| | | | |
|---|---|---|---|
| 3,234,024 | 2/1966 | Leinonen | 206/316 |
| 3,385,470 | 5/1968 | Dorosz et al. | 220/67 |
| 3,444,795 | 5/1969 | Nerwin | 206/316 |
| 3,543,963 | 12/1970 | Heisler | 220/67 |
| 4,361,246 | 11/1982 | Nelson | 220/67 |
| 4,505,387 | 3/1985 | Seto | 206/316 |
| 4,640,432 | 2/1987 | Tate et al. | 220/67 |

FOREIGN PATENT DOCUMENTS 593144  5/1959  Italy ..................................... 206/316

Primary Examiner—Joseph Man-Fu Moy
Attorney, Agent, or Firm—William J. Daniel

[57] ABSTRACT

A light-tightly packaged roll of light-sensitive material, which comprises an annular end cover for each end face of the roll and a circumferential cover wound around the periphery of the roll and having lateral extensions sealed with their inner surface to the inner surface of radially outwardly projecting margins of the end covers.

6 Claims, 6 Drawing Figures

LIGHT-TIGHTLY PACKAGED ROLL OF LIGHT SENSITIVE MATERIAL

The present invention relates to a light-tightly packaged roll of light-sensitive material for daylight loading.

Rolls of light-sensitive strip material for professional use have generally been mounted on an inner core and individually packaged in light-opaque, moisture proof containers from which the rolls are removed for loading into exposure apparatus such as magazines, cassettes, camera supply chambers, etc. Such containers have customarily been formed of plastic or metal foil.

While such packaging is inexpensive and serves its intended purpose for keeping light and moisture from the contents during shipping and handling, it presents a problem when the strip material is to be loaded into the exposure apparatus. Once opened, the package is no longer light-tight, and since the contents must be removed from the package in order to be loaded into the exposure apparatus, such loading must be done in darkroom conditions to prevent fogging of the light-sensitive material.

Light and moisture proof protections for rolls of films which permit day-light loading of the film are known. In U.S. Pat. No. 4,505,387 there is disclosed a light-tightly packaged roll of light-sensitive strip material wound on a hollow supporting core, which comprises an end cover for each end surface of the roll, each of said end covers overlying at least a portion of the core while leaving the central core opening unobstructed, and extending radially outwardly to the outer convolutions of the roll and defining a light-tight end cap between the core and said outer convolutions, a circumferential cover adhered to the coiled strip material for covering at least the outermost convolution of the wound strip material while leaving the outermost end thereof uncovered, and the outer margins of the circumferential cover being folded radially inwardly over and adhered to the end covers, such outer margins being provided with short transverse slits to permit the same to be folded along the curve of the package diameter without buckling.

This package suffers from the following disadvantages.

The method of sealing the circumferential cover to the end covers by means of radially inwardly folded margins provided with slits puts high demands on the allowable dimensional tolerances for the roll of wound strip material. As a matter of fact, if the width or the diameter of the roll are larger than a expected nominal value, it may happen that the overlapping of the folded margins of the circumferential cover with the peripheral rim of the end cover becomes so small that the inner ends of the slits are not in overlapping relationship with the end covers. It is clear that any uncovered slit portions destroy the light-tightness of the film package. Practice shows that tolerances for the width of the wound strip material are always so small that they are not the cause for difficulties. However, the diameter of the roll of wound material may in practice undergo deviations as high as 2 mm for a roll with a nominal diameter of 113 mm.

These deviations are caused by small deviations in the thickness of the core support and of the coated layer(s) which, however, become multiplied by the number of convolutions of the roll.

For the same reason of light-tightness, the described method puts likewise high demands on the allowable tolerances of the width and of the slitting of the circumferential cover, and also to the accuracy of feeding this cover onto the roll of wound strip material during the packaging of the material.

Another disadvantage of the described package of light-sensitive material is its significant increase in width or axial dimension over the width or axial dimension of the roll of strip material. The increased width is caused by the thickness of the sheet material forming the end covers, plus the added thickness of the folded margins of the circumferential cover. In case there is mounted a second end cover on each end cover, the thickness added on either side of the roll of wound strip material amounts to at least three times the thickness of the wrapping material. This increased width of the packaged roll causes problems in those instances wherein the daylight loading of the roll of light-sensitive material must occur in a cassette with a rotatable spool, that is originally designed for darkroom loading of completely unwrapped rolls only. The distance between the two flanges of such spool closely corresponds with the width of the photographic strip material. In one type of customarily used cassettes, one flange of the spool is rotatably fitted to a hinged lid of the cassette to allow the roll to be axially inserted into the opened cassette over the shaft of the spool up to the other flange. The uncovered end of the roll, which forms a leader for the withdrawal of the film from the cassette, is simultaneously slid through the light-tight slot of the cassette. Subsequent closing of the lid is difficult, since the increased width of the day-light loadable roll package (as compared with the width of a non-packaged roll of strip material) prevents the movable spool flange from taking its normal position, unless extra pressure is exerted on the hingeable lid.

One type of cassettes of the described kind is a commonly used COM cassette (Computer Output Microfilm) for a roll of 105 mm×61 m film.

It is the aim of the present invention to provide an improved roll package that is free of the disadvantags of the prior art packages.

According to the present invention, a light-tightly packaged roll of light-sensitive strip material wound on a hollow supporting core, which comprises an end cover for each end surface of the roll, each of said end covers overlying at least a portion of the core while leaving the central core opening unobstructed, and extending radially outwardly to the outer convolution of the roll and defining a light-tight end cap between the core and said outer convolution, a circumferential cover secured to the wound strip material for covering at least the outermost convolution of the wound strip material while leading a leader section uncovered, said circumferential cover having a width in excess of the width of the strip material, and the rims of the circumferential cover being light-tightly secured to corresponding outer rims of the end covers, whereas the inner rims of the end covers are light-tightly secured to said core, is characterized thereby that the outer rims of the end covers extend beyond the perimeter of the roll of wound strip material, the rims of the circumferential cover are folded in a direction away from the roll of wound strip material, and the corresponding rims of said circumferential cover and said end covers are sealed to each other on their sides that face the roll of wound strip material.

According to a particular interesting embodiment of the invention, the sealed rims extend radially outwardly of the roll of wound material, in the plane of the end covers.

The light-tightly packaged roll according to the present invention has the advantage that the width of the roll of wound strip material is increased by only one thickness of wrapping material at each end so that no problems are encountered in practice in the loading of cassettes or magazines, the unwinding spool of which is originally designed for receiving unwrapped rolls of film or paper.

The light-tightly packaged roll according to the invention has the further advantage of eliminating the need for slits in the end margins of the circumferential cover, or alternatively in the outer margins of the end covers as disclosed in U.S. Pat. No. 4,148,395, and hence placing much less demands on the accuracy of cutting of the slits, and on the relative positioning of the side margin of the covers upon the assembling of the packaging. In the packaged roll according to the invention, the seal between the covers may have a width ranging from approximately 3 to 6 mm. The extremities of the end covers and of the circumferential cover need not necessarily coincide, and thus the circumferential cover an protrude slightly over the end covers in the case of a film roll that is thicker than a normal value, or the end covers can protrude over the circumferential cover in case the diameter of the film roll is smaller than a normal value.

The favourable cooperation of a packaged film roll according to the invention with the unwinding spool of a standard magazine or cassette, is based on the perception that there is virtually no space available on the spool in the axial direction, i.e. between the ends of the roll of film and the flanges of the spool but, on the contrary, that space is available in the radial direction of the spool since the spools are always designed in such a way that also film rolls with a diameter that is at least 5 to 10% larger than a nominal value can be accepted. As a consequence thereof, the sealed rims of the wrapping foils of the present package can extend to the outer peripheral limits of the flanges of the spool in the magazine, and said sealed rims can even extend beyond the perimeter of said flanges over a distance that can range in practice from one to several millimeters, before touching the wall of the cassette or magazine.

An advantageous aspect of a light-tightly packaged roll according to the invention is that the covers of the wrapping material are adhered to each other along mutually facing inner surfaces. This as distinct from the packages disclosed in the mentioned patents wherein the margins of adjacent covers are in overlying relationship, so that the outer side of one cover must be in contact with the inner side of the other cover. The sealing of the wrapping covers along the same surfaces has the advantage that conventional wrapping foils such as polyethylene coated paper, i.e., with the coating on only one surface, may be used that combine a good stiffness, which is an advantage for the easy handling of the foils in the manufacturing and wrapping process, with a good sealability, since adjacent polyethylene surfaces readily lend themselves to heat-sealing.

Figure 2:
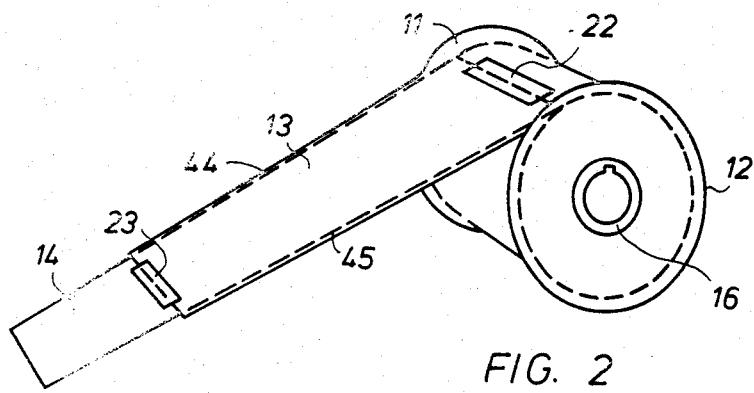
Figure 4:
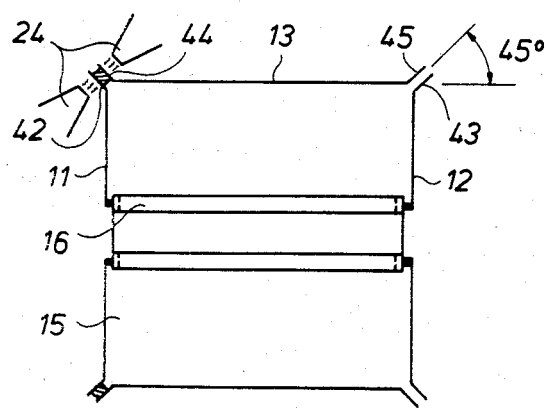
Figure 3:
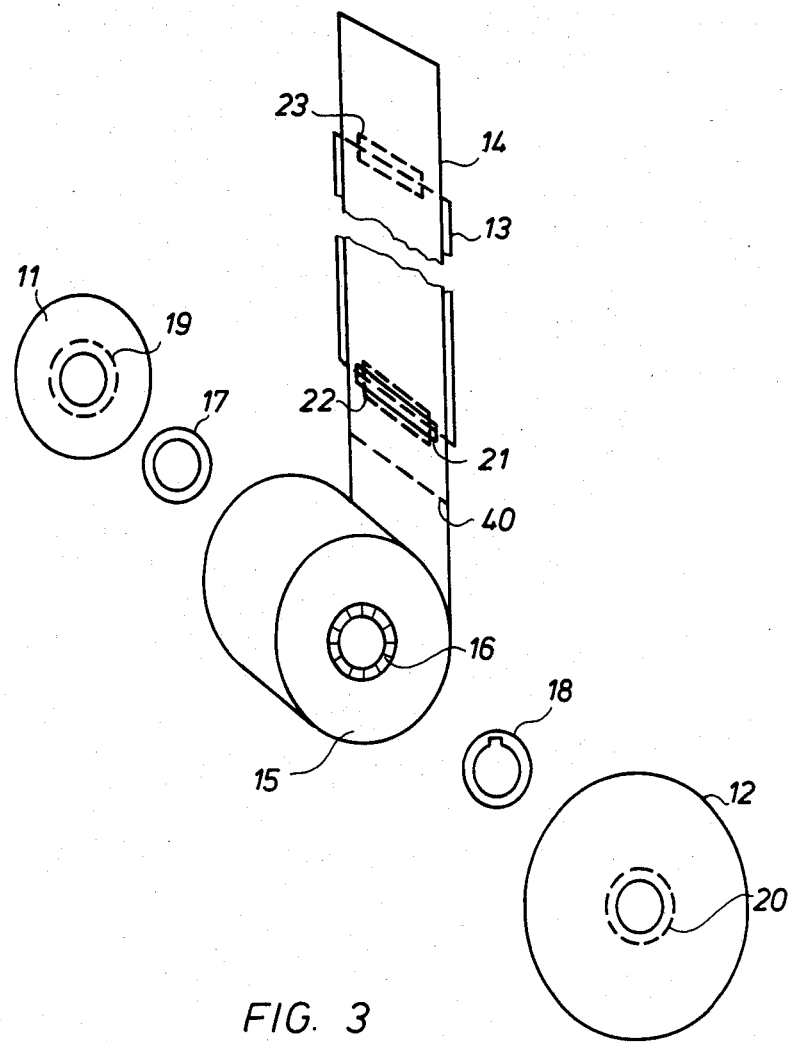
Figure 5:
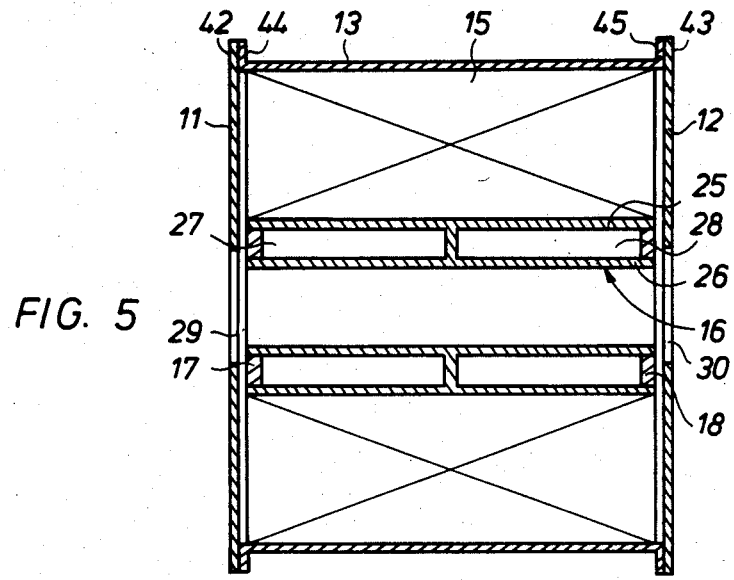
Figure 6:
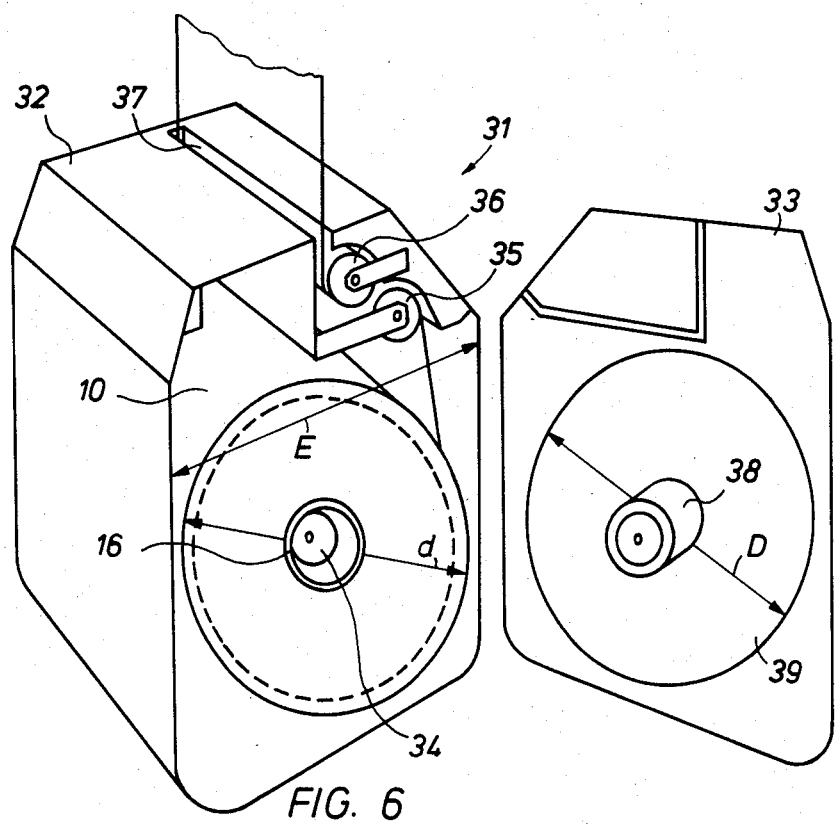

The invention will be described hereinafter by way of example with reference to the accompanying drawings wherein:

FIG. 1 is a perspective view of one embodiment of a light-tightly packaged roll according to the present invention, FIG. 2 is a perspective view of the roll of FIG. 1, the circumferential cover being unwound, FIG. 3 is an exploded view illustrating the packaged roll according to FIGS. 1 and 2, FIG. 4 is a longitudinal diagrammatic sectional view of a packaged roll, FIG. 5 is a detailed sectional view of a packaged roll, and FIG. 6 is a perspective view illustrating the co-operation of a roll of film with a standard magazine.

Referring to FIG. 1, a light-tightly packaged roll 10 of light-sensitive film material comprises two end covers 11 and 12, and a circumferential cover 13 sealed to said end covers, as a light-tight wrapping for the light-sensitive material. The packaged roll has a leader 14 that protrudes from the circumferential cover and by means of which the film can be threaded in the slot of a standard magazine as will be described later.

FIG. 2 illustrates the same film roll as the one shown in FIG. 1, the leader 14 being however unwound so far that the circumferential cover has completely been separated from the end covers.

FIG. 3 is an exploded view of the packaged roll of FIGS. 1 and 2 representing a film roll 15 that is wound on a hollow core 16. The core is provided at both its extremities with plastic rings 17 and 18 that permit the heat-sealing of the inner side of rims 19 and 20, shown in broken lines, of the end covers 11 and 12 to the core.

The leader 14 of the packaged roll is secured to the leading edge of the roll of film by means of a strip of self-adhesive tape 21. The circumferential cover 13 is secured to the leader by means of strips of self-adhesive tape 22, respectively 23, see also FIG. 2.

The securing of the circumferential cover to the end covers in the manufacturing process of the packaged roll, is illustrated in FIG. 4. The end covers, which consist of a moisture-tight and light-tight heat-sealable foil that may be composed of a layer of paper, aluminium and black pigmented heat-sealable polyethylene, are first secured to the ends of the roll by the application of heat and pressure on an inner circular zone of the outer side of the covers, thereby to seal the rimlike zones 19 and 20 of the covers of the rings 17 and 18 at the core extremities.

Then the circumferential cover 13, which may be of the same basic material as the end covers, is fed towards the roll, and while the roll is slowly rotated, and the rims 44,45 of the circumferential cover and then corresponding rims 42,43 of the end covers are folded outwardly over approximately 45 degrees, the rims of the circumferential cover are progressively brought into contact with the rims of the end covers, whilst applying heat and pressure as illustrated by the numeral 24. The circumferential cover can extend over approximately 405 to 540 angular degrees about the roll. During the first convolution of the circumferential cover 13, the polyethylene innerside of the rims of the cover is sealed to the corresponding innerside of the outer rims of the end covers. As one convolution has been completed, the polyethylene innerside of the rims of the circumferential cover becomes sealed to the outside of the already sealed rims of this cover. The leader of the finished package extends freely between the leading end of the circumferential cover and the next winding of said cover, as shown in FIG. 1. The overlapping of the circumferential cover over an angle between approximately 90 and 180 degrees, ensures a light-tight seal of the film roll.

A detailed longitudinal sectional view of a light-tightly packaged roll of light-sensitive film is shown in FIG. 5. The core 16 is composed as known in the art by an outer and an inner tube 25, resp. 26, which are interconnected by radial ribs such as 27 and 28. These radial ribs are slightly recessed at the lateral extremities of the core so that a space is provided wherein rings such as 17 and 18 may be press-fitted. The central holes 29 and 30 in the end covers are slightly larger than the inner diameter of the core 16, so that the key-slot 41 remains uncovered. It may be seen in FIG. 5 that the sealed rims of the covers no longer take a position that is at 45° as shown in FIG. 4 but, on the contrary, that is situated in the plane of the end faces of the roll. This straight position is obtained automatically by the fitting of the packaged roll between the flanges of an unwinding spindle onto which the roll is positioned.

This situation becomes more clear with reference to the illustration of FIG. 6 which shows a standard magazine that is originally designed for being loaded in the darkroom with a roll of unexposed light-sensitive film. The drawing is a diagrammatic illustration of an aluminium cassette for a roll of triacetate film measuring 105 mm by 61 m, and marketed by Agfa-Gevaert N. V. for use in the apparatus Agfa-Gevaert COM Recorder type 2300 or 2400. The magazine 31 comprises generally a housing 32 and a detachable lid 33 that may be light-tightly secured to the open side of the magazine by means of suitable latches or the like. A spindle 34 is rotatably journalled on the rearwall of the housing. The spindle has a flange near said rearwall, and a key that co-operates with the key-slot 41 in the core of the roll. The mentioned flange and key are not shown in the figure. During the insertion of the roll of film in the housing, the leader 14 is threaded through the rollers 35 and 36 that together with co-operating concave wall portions of the housing define a light-tight outlet slot 37 for the film.

The lid 33 of the magazine is provided with a short spindle 38 that is freely rotatable on a pin fixed in the lid. The spindle has a flange 39.

After the packaged roll has been located in the magazine in daylight, the lid 33 is light-tightly secured to the housing. The spindle section 38 fits in the core 16 of the film roll and co-operates thereby with the spindle 34 to rotatably support the film roll. The flange 39 closely fits against the outerside end cover of the packaged roll, and it also urges and roll axially in the housing until the innerside end cover contacts the flange that is fitted to the innerside end of the spindle 34. The width of the packaged roll being increased by only two times the thickness of the wrapping material (one thickness at each side of the roll), it is shown that this minor increase in thickness does not cause an increase in pressure on the flange 39 which would be such that closing of the lid 33 would become difficult or problematic.

The operation of closing the lid of the magazine has also the effect that the sealed outer rims of the roll package, that may still take a slanting position as illustrated in FIG. 4, now become straightened so that they lie in flat contact with the spool flanges. The diameter of said end covers, indicated by d in FIG. 6, may be smaller than or equal to the diameter of the flanges, as indicated by D. The diameter d may even be slightly larger than D without impeding the unwinding of the wound film, since the distance E between the opposed walls of the magazine is larger than the flange diameter D. Furthermore, even a slight sliding contact of the edges of the end covers with the inner surface of the walls of the magazine, does not obstruct the unwinding of the film.

The magazine being loaded as described, the operator seizes the leader tongue 14, as illustrated in FIG. 1, that extends from the magazine slot 37, and pulls until the complete circumferential wrapper has been withdrawn from the roll and from the magazine. The leader 14 perfectly controls the rupturing of the sealing between the circumferential cover and the end covers, since the tightness of the leader is much greater than that of the covers. Thus there is no risk for the circumferential cover to start to rupture widthwise but, on the contrary, the seal at the lateral rims of this cover is progressively broken as the cover is withdrawn with the help of the leader. A preferred material for the construction of the leader is polyethylene terephthalate, but also weaker materials such as triacetate may be used in case the sealing strength of the covers is sufficiently small.

As the circumferential cover has been completely withdrawn, the operator may cut the film at a position as indicated by way of example by the broken line 40 in FIG. 3, but he may also detach the leader and the circumferential cover by removing the two tapes 21 and 22.

The loaded magazine is then placed in daylight in an exposure apparatus, the leading film end is threaded in the apparatus, and after the magazine section of this apparatus has been closed, the apparatus is ready for carrying out successive exposures on film withdrawn from the magazine.

After the film roll has been completely used, the magazine is removed from the apparatus, opened, and the empty core with the end covers still adhering thereto can be discarded.

The invention is not limited to the described embodiment.

It will be understood that sealing techniques different from heat-sealing may be used for the attaching of the light-tight covers. Further, the sealing of the inner rim of the end covers to the core of the roll may occur in a way different from the sealing of the outer rims of the end covers to the circumferential cover.

The leading end of the film may be used to perform the function of the separate leader 14. However, it should be considered that this means a loss of light-sensitive material of a length of 50 to 80 cm. Therefore, it may be more interesting to use a separate leader for the film roll.

The wrapping materials used for the end covers and for the circumferential cover may differ from each other.

Finally, the support for the light-sensitive material may also be paper, a composite material, etc.

We claim:

1. A light-tightly packaged roll of light-sensitive strip material wound on a hollow tubular supporting core, which comprises a generally annular opaque end cover for each end face of said roll, said end covers having their inner margins light-tightly affixed to the opposite end edges of the core and leaving the interior opening of the core unobstructed while the outer diameter thereof exceeds the diameter of said roll and thus projecting at their outer margins radially beyond the peripheral limits of the roll continuously around the roll periphery, and an opaque circumferential cover wound around at least the outermost convolution of the coiled strip material while leaving a leader section projecting outside and wound cover, said circumferential cover having a dimension parallel to the roll axis exceeding the width of said strip material to provide marginal extensions at both ends of the roll, said marginal extensions being flared angularly outwardly of said roll generally parallel to the radially projecting margins of the end voers, the mutually facing sides of said marginal extensions and radially projecting margins being adhesively sealed together.

2. A light-tightly packaged roll according to claim 1, wherein the ends of said circumferential cover are attached to said roll of strip material.

3. A light-tightly packaged roll according to claim 1, wherein said leader section is formed by a separate leader that is adhered to the leading extremity of the roll wound strip material.

4. A light-tightly packaged roll according to claim 1, wherein the leading end of the circumferential cover is attached to said separate leader, and the trailing end of said circumferential cover is attached to the leading end of the roll of wound strip material.

5. A light-tightlyly packaged roll according to claim 1, wherein the adhesively sealed margins and extensions extend radially outwardly generally perpendicularly of the axis of said roll.

6. A light-tightly packaged roll according to claim 1, wherein the end covers and the circumferential cover are formed from a wrapping material that comprises of a paper foil that is at one side provided with a layer of a heat-sealable material.

* * * * *